US011458889B1

(12) United States Patent
Angrand et al.

(10) Patent No.: US 11,458,889 B1
(45) Date of Patent: Oct. 4, 2022

(54) VEHICLE ALERT SYSTEM

(71) Applicants: Curdy F. Angrand, East Stroudsburg, PA (US); Je-Andy Angrand, Allentown, PA (US); Pascal Louis Andre Anglade, Allentown, PA (US)

(72) Inventors: Curdy F. Angrand, East Stroudsburg, PA (US); Je-Andy Angrand, Allentown, PA (US); Pascal Louis Andre Anglade, Allentown, PA (US)

( * ) Notice: Subject to any disclaimer, the term of this patent is extended or adjusted under 35 U.S.C. 154(b) by 0 days.

(21) Appl. No.: 17/238,412

(22) Filed: Apr. 23, 2021

(51) Int. Cl.
*B60Q 1/50* (2006.01)
*B60Q 9/00* (2006.01)
*B60Q 1/00* (2006.01)

(52) U.S. Cl.
CPC ........... *B60Q 1/525* (2013.01); *B60Q 1/0082* (2013.01); *B60Q 1/0088* (2013.01); *B60Q 9/008* (2013.01); *B60Q 2400/20* (2013.01)

(58) Field of Classification Search
CPC .... B60Q 1/525; B60Q 1/0082; B60Q 1/0088; B60Q 9/008; B60Q 2400/20
See application file for complete search history.

(56) References Cited

U.S. PATENT DOCUMENTS

| 3,760,349 | A |   | 9/1973  | Keister et al. |            |
|-----------|---|---|---------|----------------|------------|
| 3,947,815 | A | * | 3/1976  | Muncheryan     | B60Q 1/503 |
|           |   |   |         |                | 340/576    |
| 4,587,522 | A |   | 5/1986  | Warren         |            |
| 4,621,253 | A | * | 11/1986 | Pillinger      | B60Q 1/46  |
|           |   |   |         |                | 340/472    |
| 4,757,301 | A | * | 7/1988  | Neale, Jr.     | B60Q 1/44  |
|           |   |   |         |                | 340/479    |
| 5,126,735 | A |   | 6/1992  | Trevijano et al. |          |
| 5,245,694 | A | * | 9/1993  | Zwern          | G10L 19/00 |
|           |   |   |         |                | 704/200    |
| 5,289,181 | A |   | 2/1994  | Watanabe et al. |           |
| 5,307,060 | A |   | 4/1994  | Prevulsky et al. |          |
| 5,563,577 | A | * | 10/1996 | Adkins         | B60Q 1/46  |
|           |   |   |         |                | 340/474    |
| 5,572,201 | A |   | 11/1996 | Graham et al.  |            |
| 5,663,706 | A | * | 9/1997  | Francis        | B60Q 1/52  |
|           |   |   |         |                | 340/471    |
| 5,703,411 | A | * | 12/1997 | Bella          | B60R 16/0207 |
|           |   |   |         |                | 340/472    |
| 5,859,479 | A | * | 1/1999  | David          | B60Q 1/52  |
|           |   |   |         |                | 340/471    |
| 5,959,551 | A |   | 9/1999  | Cardillo       |            |
| 6,011,492 | A |   | 1/2000  | Garesche       |            |

(Continued)

*Primary Examiner* — Hoi C Lau
(74) *Attorney, Agent, or Firm* — Cramer Patent & Design, PLLC; Aaron R. Cramer

(57) ABSTRACT

The Vehicle Alert System has an RF transmitter system which is activated by a steering wheel switch which in turn signals matching receivers in other nearby vehicles. Upon activation, multiple receivers on other so equipped vehicles will detect the originating direction of the alert. A single board computer (SBC) will then activate a respective speaker on the interior of the receiving vehicle to indicate the direction of the alert. A dash mounted panel with LED indicators may also be provided. The device is also capable of disabling any audio entertainment systems in the receiving vehicle thereby ensuring that the warning signal is heard. A bright front mounted purple light would alert pedestrians to potential danger.

13 Claims, 4 Drawing Sheets

(56) References Cited

U.S. PATENT DOCUMENTS

| | | | | |
|---|---|---|---|---|
| 6,262,831 B1 * | 7/2001 | Bauer | | B60R 1/088 |
| | | | | 359/267 |
| 6,529,125 B1 * | 3/2003 | Butler | | B60K 37/06 |
| | | | | 340/407.1 |
| 6,958,687 B1 * | 10/2005 | Smith | | B60Q 1/50 |
| | | | | 340/472 |
| 7,095,318 B1 * | 8/2006 | Bekhor | | B60Q 1/326 |
| | | | | 340/464 |
| 7,167,086 B1 * | 1/2007 | Goins | | B60Q 1/50 |
| | | | | 340/463 |
| 7,551,102 B1 * | 6/2009 | Carson | | B60Q 1/52 |
| | | | | 340/936 |
| 8,018,328 B2 | 9/2011 | Goldstein et al. | | |
| 8,683,722 B1 * | 4/2014 | Cowan | | G09F 21/048 |
| | | | | 40/543 |
| 9,143,347 B2 | 9/2015 | Ando | | |
| 9,694,745 B2 | 7/2017 | Tsuzuki et al. | | |
| 10,343,602 B2 | 7/2019 | Groh et al. | | |
| 10,351,050 B1 * | 7/2019 | Elwell | | F21S 43/14 |
| 10,410,515 B2 | 9/2019 | Muro-Calderon | | |
| 2003/0086275 A1 * | 5/2003 | Banco | | B60Q 1/50 |
| | | | | 362/459 |
| 2003/0105568 A1 * | 6/2003 | Melnyk | | B60R 25/252 |
| | | | | 701/1 |
| 2005/0021190 A1 * | 1/2005 | Worrell | | B60K 37/06 |
| | | | | 701/1 |
| 2005/0169003 A1 * | 8/2005 | Lindahl | | G06F 3/0489 |
| | | | | 362/494 |
| 2006/0044818 A1 * | 3/2006 | Amagasa | | B60Q 1/28 |
| | | | | 362/514 |
| 2009/0109009 A1 * | 4/2009 | Gumbel | | B60Q 9/00 |
| | | | | 340/433 |
| 2009/0174682 A1 * | 7/2009 | Bowden | | B60K 37/06 |
| | | | | 345/173 |
| 2010/0019932 A1 | 1/2010 | Goodwin | | |
| 2012/0105218 A1 * | 5/2012 | Scanapico | | B60R 22/48 |
| | | | | 340/425.5 |
| 2014/0092249 A1 * | 4/2014 | Freiburger | | H04N 7/183 |
| | | | | 348/148 |
| 2014/0350836 A1 * | 11/2014 | Stettner | | G01S 17/86 |
| | | | | 356/4.01 |
| 2015/0127222 A1 * | 5/2015 | Cunningham, III | | B60Q 5/006 |
| | | | | 701/41 |
| 2015/0294572 A1 * | 10/2015 | Anstett | | B62D 15/029 |
| | | | | 340/932.2 |
| 2016/0129962 A1 * | 5/2016 | Langevin | | B62J 50/225 |
| | | | | 386/226 |
| 2016/0253903 A1 | 9/2016 | Wilk | | |
| 2018/0056858 A1 * | 3/2018 | Cunningham, III | | G08G 1/143 |
| 2018/0165891 A1 * | 6/2018 | Kim | | B60W 50/08 |
| 2018/0304801 A1 * | 10/2018 | Salter | | B60Q 1/34 |
| 2019/0250597 A1 * | 8/2019 | Takama | | B60W 50/14 |
| 2020/0130676 A1 * | 4/2020 | Smid | | B60W 30/06 |
| 2020/0361370 A1 * | 11/2020 | Wescott | | B60Q 1/525 |
| 2021/0136899 A1 * | 5/2021 | Elwell | | F21S 43/15 |
| 2021/0347262 A1 * | 11/2021 | Galan Garcia | | B32B 27/30 |
| 2022/0026039 A1 * | 1/2022 | Jennings | | B60Q 1/50 |

* cited by examiner

VEHICLE ALERT SYSTEM

FIELD OF THE INVENTION

The presently disclosed subject matter is directed to an alert system and more specifically to a vehicle alert system.

BACKGROUND OF THE INVENTION

The sound of a motor vehicle horn is a common one especially in large urban areas. In fact, the commonality and problems of such noise intrusions have forced many communities into drafting legislation to limit use of a vehicle's horn. While such a solution may address the symptom of the underlying problem, it still does not reduce the need to alert other motor vehicle drivers of impending problems or emergency situations. Other problems arise when motor vehicle drivers do not either hear or see approaching emergency motor vehicles.

Thus, it is all too common experience in which emergency vehicles and conventional motor vehicles collide with often disastrous or deadly results. Accordingly, there exists a need for a means by which the drivers of other motor vehicles can be easily alerted but without the necessity of high sound levels and associated noise pollution. The development of the vehicle alert system fulfills this need.

SUMMARY OF THE INVENTION

The principles of the present invention provide for a vehicle alerting device for a motor vehicle which has a green light which is disposed at a rear of the motor vehicle, a plurality of purple lights which are disposed on a front the motor vehicle, a vehicle dash area which has a steering wheel which is provided with a center-mounted activation pushbutton, an active transmission light which indicates that the vehicle alerting device is actively transmitting a warning signal, and a plurality of speakers which produce an audible sound array and a directional warning sound generated within a passenger compartment of the motor vehicle.

The green light may notify one or more motorists and one or more pedestrians that the motor vehicle is equipped with the vehicle alerting device. The rear of the motor vehicle may be equipped with a rear transceiver. The purple lights may notify the one or more motorists and the one or more pedestrians to possible danger. The front of the motor vehicle may be equipped with a front transceiver.

The vehicle alerting device for a motor vehicle may also comprise a first side of the motor vehicle and may be equipped with three first side transceivers or three second side transceivers which may be hidden within the motor vehicle. The transceivers may be interconnected by a wiring harness to a microcontroller within the motor vehicle to control the vehicle alerting device. The activation pushbutton may activate a warning capability of the vehicle alerting device. The warning signal may be transmitted as the vehicle alerting device may be silent in operation.

The vehicle alerting device for a motor vehicle may further comprise an annunciator screen is located in an infotainment screen disposed on the vehicle dash area and the annunciator screen is located in a rear view mirror. The annunciator screen may display a plurality of information selected from the group consisting of a plurality of status information, a plurality of directional warning information, and a plurality of volume control information. The directional warning sound may be in a direction of the directional warning sound detected by the front transceiver, the rear transceiver, the right-side transceivers, and the left side transceivers.

The vehicle alerting device for a motor vehicle may also have a twelve-volt power connection providing electrical power to a five-volt regulator and a three-volt regulator. The five-volt regulator may provide 5.0 VDC to the microcontroller. The three-volt regulator may provide three-point-three volts 3.3 VDC to the front transceiver, the rear transceiver, the right-side transceivers, and the left side transceivers. The vehicle alerting device for a motor vehicle further comprises a status light which is disposed on the vehicle dash area adapted to provide indication to a driver that the vehicle alerting device is powered on. The motor vehicle may be a vehicle selected from the group consisting of a four-door sedan, an SUV, a truck, or a bus.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
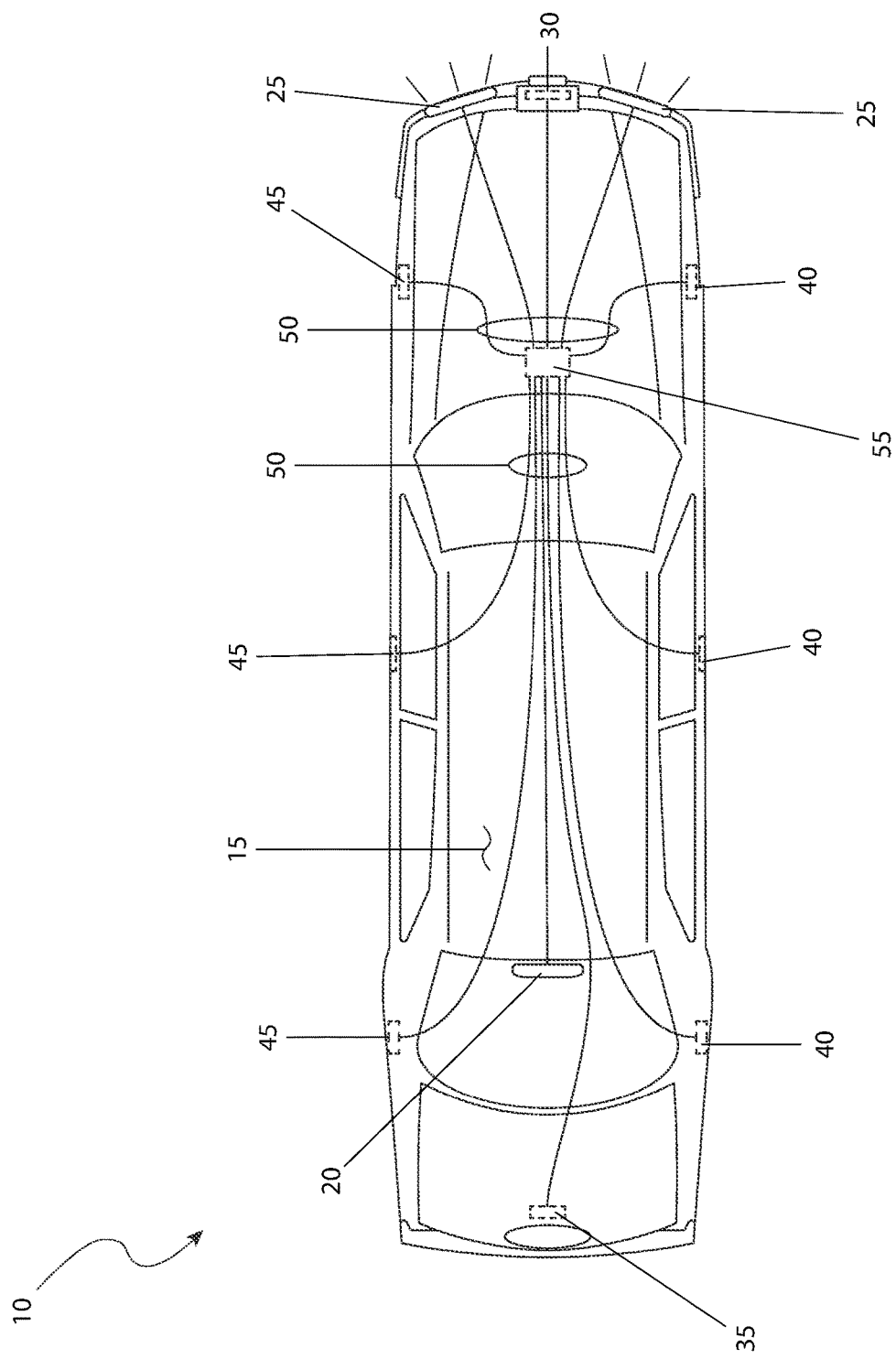
FIG. 1 is a top view of the vehicle alerting device, installed on a motor vehicle, according to the preferred embodiment of the present invention.

DESCRIPTIVE KEY 10 vehicle alerting device
15 motor vehicle
20 green light
25 purple light
30 front transceiver
35 rear transceiver
40 right side transceiver
45 left side transceiver
50 wiring harness
55 microcontroller
60 vehicle dash area
65 steering wheel
70 activation pushbutton
75 status light
80 active transmission light
85 annunciator screen
90 infotainment screen
95 rearview mirror
100 speaker
105 traffic intersection
110 first equipped vehicle
115 second equipped vehicle
120 pedestrian
125 crosswalk
130 light rays
135 third equipped vehicle 140 twelve-volt power connection
145 five-volt regulator
150 three-volt regulator
155 communication bus
160 crystal oscillator
165 entertainment system interface

DESCRIPTION OF THE PREFERRED EMBODIMENTS

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, is a top view of the vehicle alerting device 10, installed on a motor vehicle 15, according to the preferred embodiment of the present invention is disclosed. The vehicle alerting device (herein also described as the "device") 10, provides for a vehicle warning system similar to a horn, but without the inherent problems of noise pollution. The motor vehicle 15 is depicted as a four-door sedan for purposes of illustration. However, it is noted that the teachings of the device 10 can be applied to any type of motor vehicle 15 including SUV's, truck, busses, and the like. As such, the use of the device 10 with any particular type of device 10 should not be interpreted as a limiting factor of the present invention.

The motor vehicle 15 is provided with a green light 20 at the rear of the motor vehicle 15, similar in location to a third brake light. The green light 20 is designed to let nearby motorists and pedestrians 120 know that the motor vehicle 15 is equipped with the functionality of the device 10, to be further described herein below. The front of the motor vehicle 15 is equipped with at least two (2) purple lights 25 to serve to alert pedestrians to possible danger. The purple lights 25 will be described in further detail herein below. The front of the motor vehicle 15 is equipped with a front transceiver 30. The rear of the motor vehicle 15 is equipped with a rear transceiver 35. The right side of the motor vehicle 15 is equipped with three (3) right side transceivers 40. The left side of the motor vehicle 15 is equipped with three (3) left side transceivers 45. The front transceiver 30, the rear transceiver 35, the right-side transceivers 40, and the left side transceivers 45 are shown by dotted lines due to their hidden nature and would be located behind grilles, body trim, moldings, and the like. The front transceiver 30, the rear transceiver 35, the right-side transceivers 40, and the left side transceivers 45 are interconnected by wiring harness 50 to a microcontroller 55 (herein shown by dashed lines due to its hidden nature), within the vehicle. The microcontroller 55 provides all of the control functionality for the device 10 and will be described in greater detail herein below.

Figure 2:
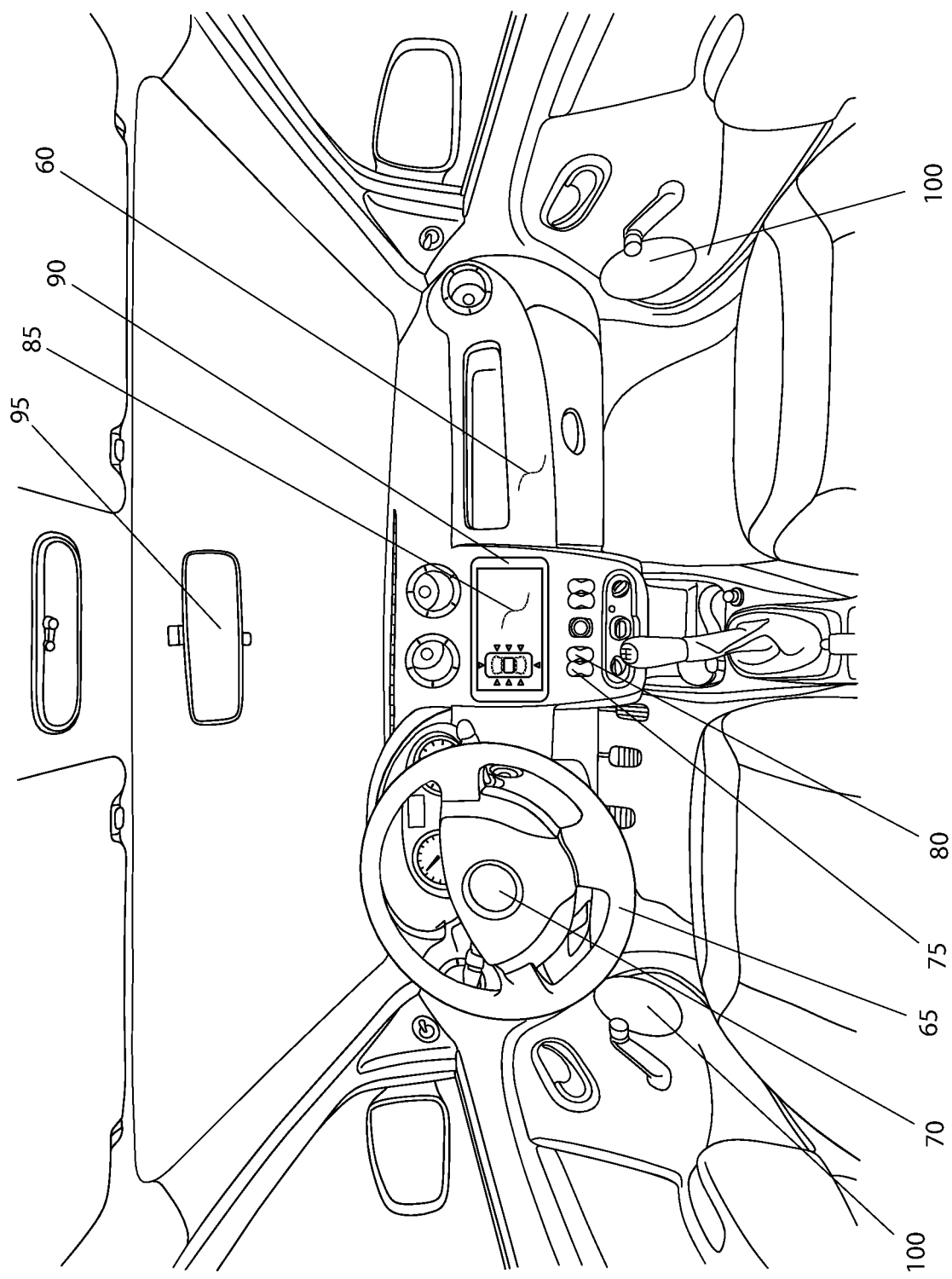
FIG. 2 is a perspective view of a vehicle dash area, depicting various components of the vehicle alerting device, according to the preferred embodiment of the present invention.

Referring next to FIG. 2, a perspective view of a vehicle dash area 60, depicting various components of the device 10, according to the preferred embodiment of the present invention is depicted. The steering wheel 65 is provided with a center-mounted activation pushbutton 70, similar in location and operation to a conventional horn switch. The activation pushbutton 70 is the means by which the driver of the motor vehicle 15 (as shown in FIG. 1) activates the warning capability of the device 10. The vehicle dash area 60 also provides for a status light 75 to provide indication to the driver that the device 10 is powered on. As the device 10 is silent in operation, an active transmission light 80 provides indication that the device 10 is actively transmitting a warning signal. Advance models of the device 10 may be provided with an annunciator screen 85 located in the infotainment screen 90 or the rearview mirror 95 which displays status information, directional warning information, volume control, and the like. At least four (4) speakers 100, two (2) of which are shown in FIG. 2, are used to produce an audible sound array. Via the use of fade and balance controls, well known in the motor vehicle audio system field, a directional warning sound can be generated within the passenger compartment of the motor vehicle 15 that is representative of the direction of the generated alert as detected by the front transceiver 30, the rear transceiver 35, the right-side transceivers 40, and the left side transceivers 45 (as of which are shown in FIG. 1). As such, the audible warning is received in much the same nature as a warning received from a conventional horn, but without the undesirable sound being generated outside of the motor vehicle 15.

Figure 3:
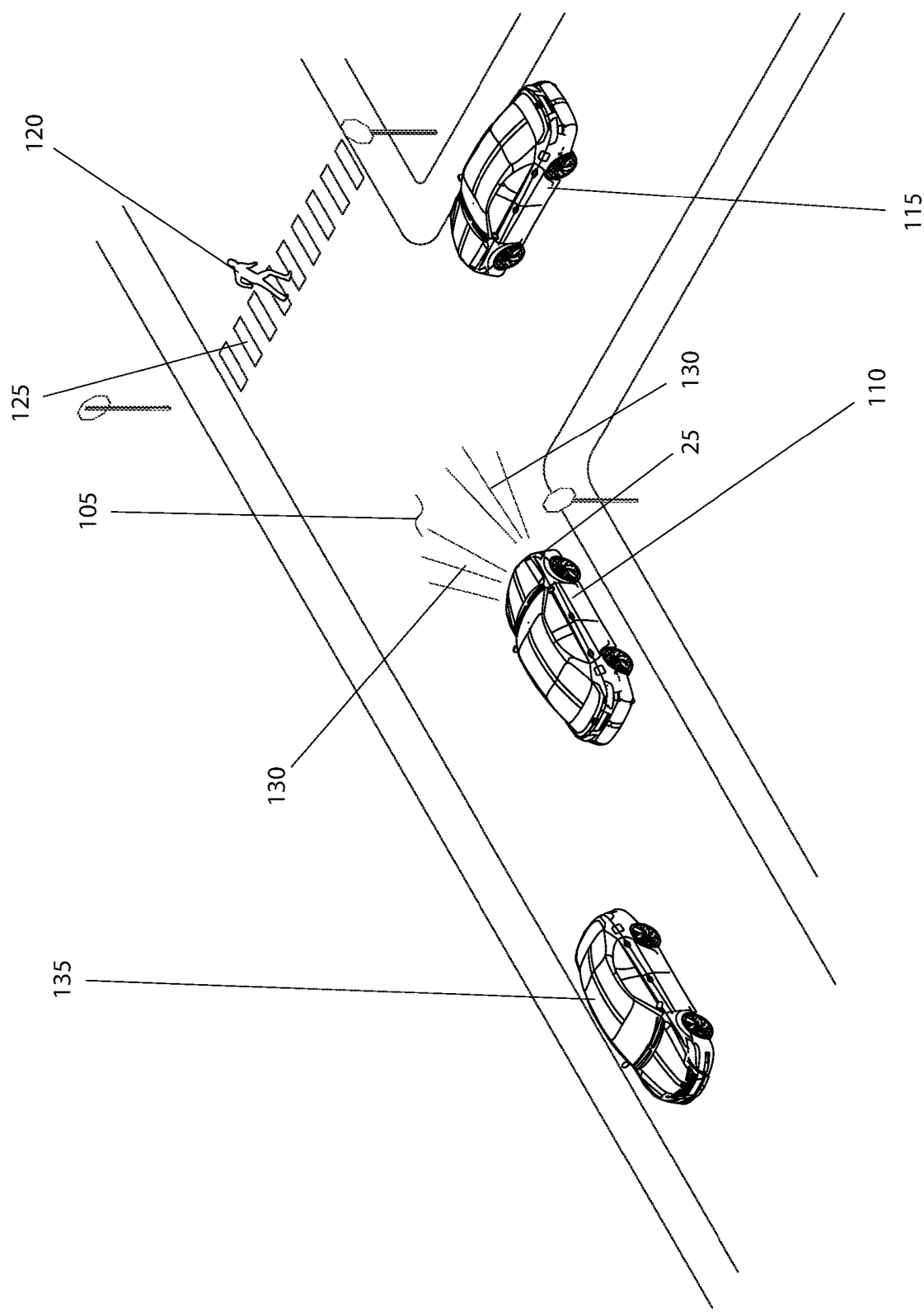
FIG. 3 is a perspective view of a traffic intersection with various motor vehicle equipped with the vehicle alerting device, according to the preferred embodiment of the present invention.

Referring now to FIG. 3, a perspective view of a traffic intersection 105 with various motor vehicle 15 equipped with the device 10, according to the preferred embodiment of the present invention is shown. The traffic intersection 105 is typical in nature and those skilled in the art will realize that the teachings of the device 10 can apply to any type of traffic intersection 105. A first equipped vehicle 110 activates the device 10 through use of the activation pushbutton 70 (as shown in FIG. 2) for purposes of alerting a second equipped vehicle 115 and/or a pedestrian 120 in a crosswalk 125. The second equipped vehicle 115 would be alerted by a sound from their speakers 100 (as shown in FIG. 2) emanating from the front side of the driver's side, resulting the in driver of the second equipped vehicle 115 to look towards the direction of the first equipped vehicle 110. The pedestrian 120 will be alerted by the light rays 130 from the purple lights 25. Depending on the dynamic situation, the driver of the second equipped vehicle 115 and/or the pedestrian 120 can take preventative action. The driver of a third equipped vehicle 135 would be also warned of the alert by a sound from their speakers 100 emanating from the rear side of the driver's side, resulting the in driver of the third equipped vehicle 135 to check their mirror to see if any action needs to be taken.

Figure 4:
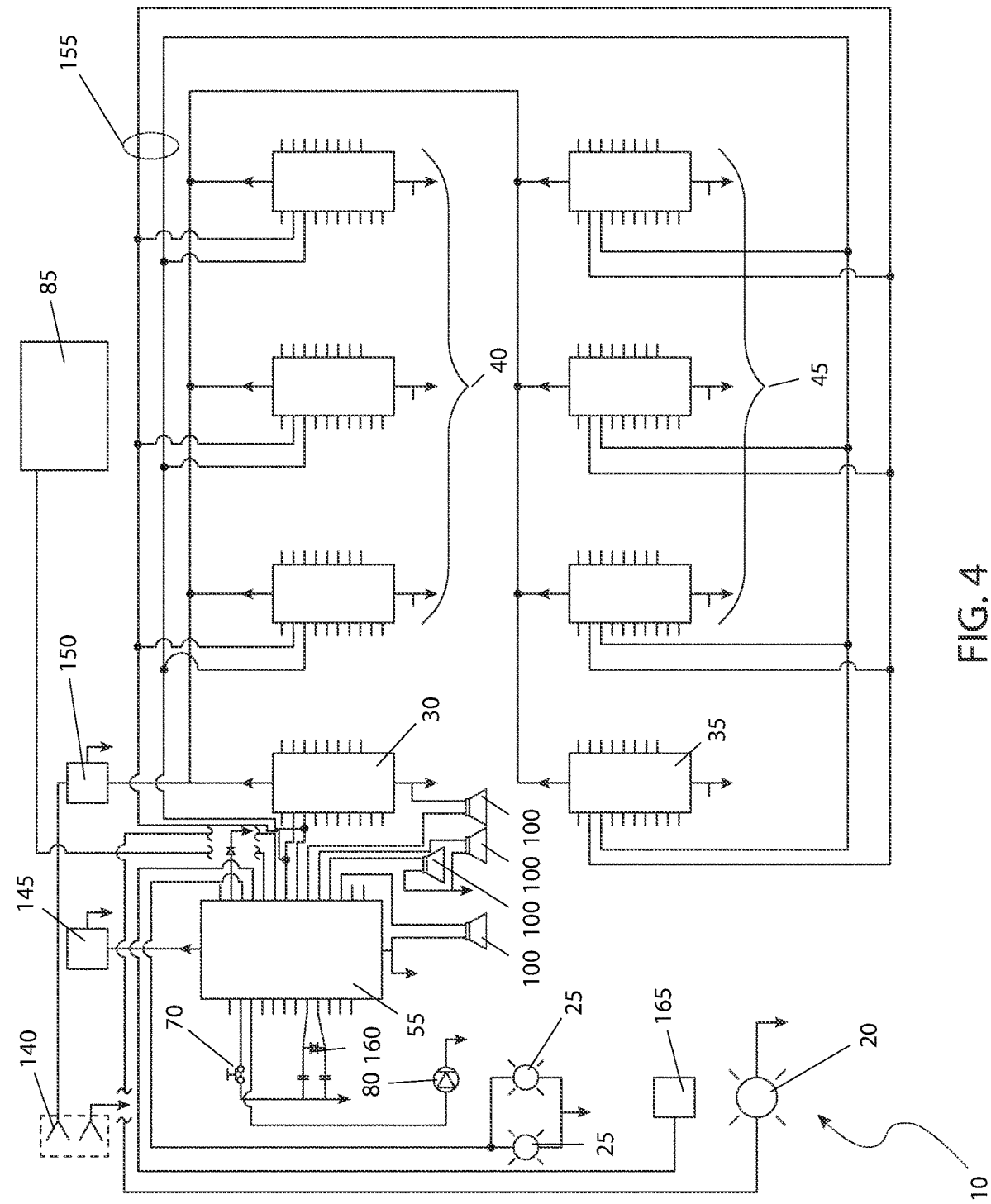
FIG. 4 is an electrical block diagram of the vehicle alerting device, according to the preferred embodiment of the present invention.

Referring to FIG. 4, an electrical block diagram of the device 10, according to the preferred embodiment of the present invention is disclosed. A twelve-volt power connection 140 provides power to a five-volt regulator 145 and a three-volt regulator 150. The five-volt regulator 145 provides five-volt direct current (5.0 VDC) to the microcontroller 55, while the three-volt regulator 150 provides three-point-three volts direct current (3.3 VDC) to the front transceiver 30, the rear transceiver 35, the right-side transceivers 40, and the left side transceivers 45. The front transceiver 30, the rear transceiver 35, the right-side transceivers 40, and the left side transceivers 45 communicate with the microcontroller 55 via a communication bus 155, comprised of the wiring harness 50 as shown in FIG. 1) in a full duplex manner that allows for both transmitting and receiving of radio frequency signals. The activation pushbutton 70 provides an input signal to the microcontroller 55 which instructs the front transceiver 30, the rear transceiver 35, the right-side transceivers 40, and the left side transceivers 45 to generate an alert signal. The status light 75 is illuminated whenever the device 10 has power applied to it, and the active transmission light 80 is illuminated whenever the device 10 is activated by the activation pushbutton 70. A crystal oscillator 160 provides timing cycles to provide rhythm to do the calculations. An output of the microcontroller 55 is connected to the two (2) purple lights 25. Another output is connected to the annunciator screen 85 if the motor vehicle 15 (as shown in FIG. 1) is so equipped. Yet another output from the microcontroller 55 is routed to the green light 20. Finally, an output from the microcontroller 55 is routed to entertainment system interface 165 which reduces the volume or completely mutes the existing entertainment system within the motor vehicle 15.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 4. The user would procure the device 10 from conventional procurement channels such as motor vehicle manufacturers, automotive suppliers, aftermarket manufacturers, mail order and internet supply houses and the like. It is envisioned that the invention would be provided as standard or optional equipment on a new motor vehicle 15 as well as being made available as an add-on kit for an existing motor vehicle 15. Special attention would be paid to various options such as the annunciator screen 85 in either the infotainment screen 90 or the rearview mirror 95.

After procurement and prior to utilization, the device 10 would be prepared in the following manner: the microcontroller 55 would be installed in the motor vehicle 15 and the front transceiver 30, the rear transceiver 35, the right side transceivers 40, and the left side transceivers 45 would be installed on the perimeter as shown in FIG. 1; final electrical connections are made to the green light 20, the purple lights 25, the activation pushbutton 70, the status light 75, the active transmission light 80, the annunciator screen 85 (if so equipped), and the speakers 100. At this point in time, the device 10 is ready for operation.

During utilization of the device 10, the following procedure would be initiated: while referring to FIG. 3; in the event of a situation requiring alerting or warning of an emergency situation, the driver of the first equipped vehicle 110 will press the activation pushbutton 70; the microcontroller 55 sends a signal to the front transceiver 30, the rear transceiver 35, the right side transceivers 40, the left side transceivers 45, the purple lights 25, the active transmission light 80, the annunciator screen 85 (if so equipped) and the entertainment system interface 165; the RF signal is then picked up by nearby equipped vehicles such as the second equipped vehicle 115 and the third equipped vehicle 135; the front transceiver 30, the rear transceiver 35, the right side transceivers 40, and the left side transceivers 45 in said vehicles 110, 115, 135 will then deactivate any entertainment systems by their respective entertainment system interface 165; the speakers 100 in said vehicles 110, 115, 135 will generate a spatially correct audio signal to alert the driver to look in the respective direction and take any correction action. In a simultaneous manner, the purple lights 25 are activated to alert any pedestrian 120. When the activation pushbutton 70 is released in the activating vehicle 110, the device 10 resets to its previous state and is ready for any subsequent activation.

The features of the device 10 produce the following benefits: works in a manner similar to a horn but without the associated noise pollution; only alerts similarly equipped vehicles 115, 135 in close proximity; low-power RF design only travel for a set distance; activates purple light 25 on front of alerting vehicle 110 in case of pedestrians 120; works for use in major cities; is ideal for use in area with noise control legislation; can be provided as standard or optional equipment on new motor vehicles 15; could easily be provided as an add-on kit for existing motor vehicles 15; eliminates distraction of in-car entertainment systems; may also be tied into emergency vehicle's siren system to alert driver of approaching police car, fire equipment ambulances, rescue squads, and the like thus protecting lives of emergency personnel; and can be use in all types of motor vehicles 15.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A vehicle alerting device, comprising:
 a green light disposed at a rear of a motor vehicle;
 a plurality of purple lights disposed on a front the motor vehicle;
 a vehicle dash area having a steering wheel provided with a center-mounted activation pushbutton;
 an active transmission light indicating that the vehicle alerting device is actively transmitting a warning signal;
 a first side of the motor vehicle is equipped with 3 first side transceivers;
 a second side of the motor vehicle is equipped with 3 second side transceivers; and
 a plurality of speakers producing an audible sound array and a directional warning sound generated within a passenger compartment of the motor vehicle;
 wherein the rear of the motor vehicle is equipped with a rear transceiver;
 wherein the front of the motor vehicle is equipped with a front transceiver;
 wherein the green light notifies one or more motorists and one or more pedestrians that the motor vehicle is equipped with the vehicle alerting device; and
 wherein the warning signal is transmitted as the vehicle alerting device is silent in operation.

2. The vehicle alerting device, according to claim 1, wherein the purple lights notify the one or more motorists and the one or more pedestrians to possible danger.

3. The vehicle alerting device, according to claim 1, wherein the transceivers are hidden within the motor vehicle.

4. The vehicle alerting device, according to claim 1, wherein the transceivers are interconnected by a wiring harness to a microcontroller within the motor vehicle to control the vehicle alerting device.

5. The vehicle alerting device, according to claim 1, wherein the activation pushbutton activates a warning capability of the vehicle alerting device.

6. The vehicle alerting device, according to claim 1, further comprising an annunciator screen is located in an infotainment screen disposed on the vehicle dash area.

7. The vehicle alerting device, according to claim 6, wherein the annunciator screen displays a plurality of information selected from the group consisting of a plurality of status information, a plurality of directional warning information, and a plurality of volume control information.

8. The vehicle alerting device, according to claim 1, wherein the directional warning sound is in a direction of the directional warning sound detected by the front transceiver, the rear transceiver, the first side transceivers, and the second side transceivers.

9. The vehicle alerting device, according to claim 1, further comprising a twelve-volt power connection providing electrical power to a five-volt regulator and a three-volt regulator.

10. The vehicle alerting device, according to claim 9, wherein the five volt regulator provides 5.0 VDC to the microcontroller.

11. The vehicle alerting device, according to claim 9, wherein the three volt regulator provides three-point-three volts 3.3 VDC to the front transceiver, the rear transceiver, the first side transceivers, and the second side transceivers.

12. The vehicle alerting device, according to claim 1, further comprising a status light disposed on the vehicle dash area adapted to provide indication to a driver that the vehicle alerting device is powered on.

13. The vehicle alerting device, according to claim 1, wherein the motor vehicle is a vehicle selected from the group consisting of a four-door sedan, an SUV, a truck, or a bus.

\* \* \* \* \*